(12) United States Patent
Tanwani

(10) Patent No.: US 12,499,990 B2
(45) Date of Patent: Dec. 16, 2025

(54) COMBINED VISION AND LANGUAGE LEARNING MODELS FOR AUTOMATED MEDICAL REPORTS GENERATION

(71) Applicant: Verily Life Sciences LLC, South San Francisco, CA (US)

(72) Inventor: Ajay Tanwani, Foster City, CA (US)

(73) Assignee: Verily Life Sciences LLC, Dallas, TX (US)

( * ) Notice: Subject to any disclaimer, the term of this patent is extended or adjusted under 35 U.S.C. 154(b) by 172 days.

(21) Appl. No.: 18/320,841

(22) Filed: May 19, 2023

(65) Prior Publication Data

US 2023/0386646 A1    Nov. 30, 2023

Related U.S. Application Data

(60) Provisional application No. 63/346,218, filed on May 26, 2022.

(51) Int. Cl.
*G16H 30/40* (2018.01)
*G06F 40/40* (2020.01)
(Continued)

(52) U.S. Cl.
CPC ............ *G16H 30/40* (2018.01); *G06F 40/40* (2020.01); *G06V 10/774* (2022.01); *G06V 10/806* (2022.01); *G06V 2201/03* (2022.01)

(58) Field of Classification Search
CPC ...... G06F 16/288; G06F 40/279; G06F 40/40; G06F 16/3329; G06F 16/355; G06F 40/56; G06N 3/04; G06N 3/045; G06N 3/08; G06N 3/084; G06V 10/774; G06V 10/803; G06V 10/806; G06V 10/811; G06V 10/82;
(Continued)

(56) References Cited

U.S. PATENT DOCUMENTS 10,289,679 B2 *   5/2019   Johnson ................ G06F 16/288
10,650,520 B1 *   5/2020   Beck ...................... G16H 50/20
(Continued)

OTHER PUBLICATIONS

Jing, B., et al.: On the automatic generation of medical imaging reports. CoRR abs/1711.08195 (2017), http://arxiv.org/abs/1711.08195.
(Continued)

*Primary Examiner* — Gerald Gauthier
(74) *Attorney, Agent, or Firm* — Haynes and Boone, LLP

(57) ABSTRACT

A method of generating a medical report is presented herein. In some embodiments, the method includes receiving a medical image and at least one natural language medical question, extracting at least one image feature from the image; extracting at least one text feature from the question; and fusing the at least one image feature with the at least one text feature to form a combined feature. Some embodiments further include encoding, by an encoder, the combined feature to form a transformed combined feature; computing a set of prior context features based on a similarity between the transformed combined feature and each of a set of transformed text features derived from a set of training natural language answers; and generating, by a decoder, a first natural language answer conditioned on the transformed combined feature and the set of prior context features.

20 Claims, 13 Drawing Sheets

(51) Int. Cl.
*G06V 10/774* (2022.01)
*G06V 10/80* (2022.01)

(58) Field of Classification Search
CPC ............ G06V 2201/03; G06V 10/764; G06V 30/224; G10L 15/1815; G10L 25/48; G10L 15/18; G16H 10/20; G16H 10/60; G16H 15/00; G16H 30/40; G16H 50/20; G16H 50/70; G06Q 30/02
See application file for complete search history.

(56) References Cited

U.S. PATENT DOCUMENTS

| | | | |
|---|---|---|---|
| 11,244,755 B1* | 2/2022 | Syeda-Mahmood | G06N 3/04 |
| 11,520,815 B1* | 12/2022 | Gutta | G06F 40/279 |
| 11,600,194 B2* | 3/2023 | McCann | G06N 3/084 |
| 12,242,961 B2* | 3/2025 | Luo | G06N 3/08 |
| 12,243,636 B2* | 3/2025 | Liao | G16H 50/70 |
| 2004/0122707 A1* | 6/2004 | Sabol | G16H 10/60 707/999.009 |
| 2014/0316813 A1* | 10/2014 | Bauer | G16H 10/60 705/3 |
| 2016/0364374 A1* | 12/2016 | O'Connor | G06F 16/3329 |
| 2019/0139218 A1* | 5/2019 | Song | G06N 3/08 |
| 2019/0139541 A1* | 5/2019 | Andersen | G10L 25/48 |
| 2019/0155945 A1* | 5/2019 | Zhelezniak | G06N 3/045 |
| 2019/0188848 A1* | 6/2019 | Madani | G16H 30/40 |
| 2019/0303768 A1* | 10/2019 | Zhang | G06Q 30/02 |
| 2019/0332668 A1* | 10/2019 | Wang | G10L 15/18 |
| 2020/0097814 A1* | 3/2020 | Devesa | G10L 15/1815 |
| 2020/0160985 A1* | 5/2020 | Kusuma | G16H 30/40 |
| 2020/0161005 A1* | 5/2020 | Lyman | G16H 15/00 |
| 2020/0257922 A1* | 8/2020 | Huang | G06V 30/224 |
| 2020/0356829 A1* | 11/2020 | Costabello | G06F 40/56 |
| 2021/0216862 A1* | 7/2021 | Liu | G06V 10/764 |
| 2021/0240931 A1* | 8/2021 | Farri | G16H 30/40 |
| 2021/0342646 A1 | 11/2021 | Feng et al. | |
| 2022/0059200 A1* | 2/2022 | Rahbar | G16H 15/00 |
| 2023/0106716 A1* | 4/2023 | Xiong | G06V 10/811 704/9 |
| 2023/0386646 A1* | 11/2023 | Tanwani | G06V 10/806 |
| 2025/0078676 A1* | 3/2025 | Zhang | G06N 5/04 |

OTHER PUBLICATIONS

Li, C.Y., et al.: Hybrid retrieval-generation reinforced agent for medical image report generation. CoRR abs/1805.08298 (2018).
Jing, B., et al., Show, describe and conclude: On exploiting the structure information of chest x-ray reports. CoRR abs/2004.12274 (2020).
Chen, Z., et al., Generating radiology reports via memory driven transformer. CoRR abs/2010.16056 (2020).
Najdenkoska, et al., Variational topic inference for chest x-ray report generation. CoRR abs/2107.07314 (2021).
Liu, F., et al., Exploring and distilling posterior and prior knowledge for radiology report generation. In: CVPR. pp. 13753-13762 (2021).
Tanwani, A., et al., RepsNet: Combining Vision with Language for Automated Medical Reports, CoRR abs/2209.13171 (Sep. 27, 2022).
Yan, A. et al. Weakly Supervised Contrastive Learning for Chest X-Ray Report Generation, CoRR abs/2109.12242 (2021).

* cited by examiner

| | Train | | Eval | | $N_c$ with $\rightarrow M_o$ | | | $U_A^{(Train)}$ with $\rightarrow M_o$ | | | $U_A^{(Eval)}$ with $\rightarrow M_o$ | | |
|---|---|---|---|---|---|---|---|---|---|---|---|---|---|
| | Im | QA | Im | QA | 0 | 5 | 10 | 0 | 5 | 10 | 0 | 5 | 10 |
| 2018 | 315 | 3064 | 315 | 451 | 458 | 42 | 10 | 0 | 936 | 1194 | 43 | 141 | 173 |
| 2019 | 3200 | 12,792 | 500 | 2080 | 1540 | 68 | 36 | 0 | 3842 | 4172 | 150 | 597 | 651 |
| 2020 | 4000 | 4000 | 500 | 500 | 331 | 140 | 2 | 0 | 1773 | 3940 | 0 | 230 | 472 |
| All | 7437 | 19,856 | 1799 | 2451 | 2014 | 270 | 42 | 0 | 6245 | 9306 | 185 | 975 | 1795 |

Figure 5

|  | 2018 | 2019 | 2020 | All |
|---|---|---|---|---|
| MEVF | 66.10 | — | — | — |
| MMQ | 67.00 | — | — | — |
| QCR | 69.65 | — | — | — |
| CLEF | — | 62.40 | 49.60 | — |
| CRPD | 72.70 | — | — | — |
| RepsNet - 0 | 80.89 | 67.57 | 53.20 | 63.69 |
| RepsNet - 5 | 83.55 | 79.83 | 52.50 | 71.93 |
| RepsNet - 10 | 87.05 | 81.17 | 71.43 | 80.37 |

Figure 6

|        | B1    | B2    | B3    | B4    |
|--------|-------|-------|-------|-------|
| Co-Att | 0.455 | 0.288 | 0.205 | 0.154 |
| HRGR   | 0.438 | 0.298 | 0.208 | 0.151 |
| CMAS   | 0.464 | 0.301 | 0.210 | 0.154 |
| Mem-T  | 0.470 | 0.304 | 0.219 | 0.165 |
| VTI    | 0.493 | 0.360 | 0.291 | 0.154 |
| PPKED  | 0.483 | 0.315 | 0.224 | 0.168 |
| RepsNet| 0.579 | 0.443 | 0.323 | 0.273 |

Figure 7

|              | B1    | B2    | B3    | B4    |
|:------------:|:-----:|:-----:|:-----:|:-----:|
| Vis          | 0.483 | 0.381 | 0.299 | 0.265 |
| Vis + CE     | 0.554 | 0.425 | 0.316 | 0.276 |
| Vis + CE + PC| 0.579 | 0.443 | 0.323 | 0.273 |

Figure 8

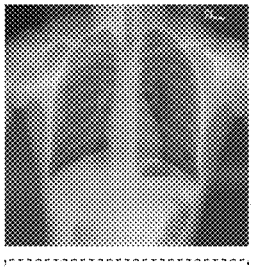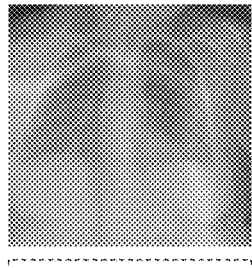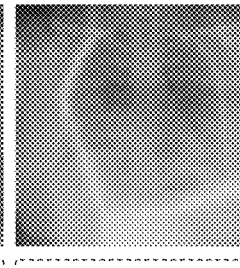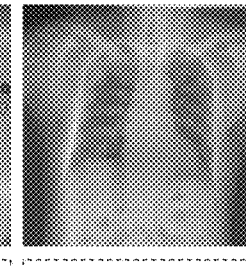

GT: lungs are clear. No focal infiltrate or effusion. Heart and mediastinal contours within normal limits. Visualized osseous structures intact.

PA: cardiomediastinal silhouette and pulmonary vasculature are within normal limits. There is no pneumothorax or pleural effusion. There are no focal areas of consolidation.

GT: stable cardiomediastinal silhouette. Stable opacity in left base scarring or atelectasis. Rounded calcified density in left lung base. Calcified granuloma. No consolidation. No pleural effusion or pneumothorax. Stable degenerative changes of spine.

PA: lungs are clear. No focal airspace consolidation. No pleural effusion or pneumothorax. Cardiomediastinal silhouette is normal in size and contour. There are calcified granulomas at right perihilar regions appear stable. There are significant degenerative changes of spine.

GT: low lung volumes are present. Heart size and pulmonary vascularity appear within normal limits. Lungs are free of focal airspace disease. No pleural effusion or pneumothorax is seen. Surgical clips are present in abdomen.

PA: heart size is normal. Low lung volumes with enlarged hilar contour. No pneumothorax or pleural effusion. Lungs are clear without focal area of consolidation. No acute bony abnormalities. Right mid clavicle fracture noted.

GT: heart size and pulmonary vascularity appear within normal limits. Lungs are free of focal airspace disease. No pleural effusion or pneumothorax is seen. Vascular calcification is noted.

PA: heart is normal in size. Mediastinum is stable. Atherosclerotic calcifications of aorta. There is no focal consolidation, pleural effusion or pneumothorax. Degenerative changes of thoracic spine are noted.

Figure 10

| | | | | |
|---|---|---|---|---|
| pretraining | | ✓ | ✓ | ✓ |
| preprocess | | | ✓ | ✓ |
| contrastive | | | | ✓ |
| | 74.47 | 79.12 | 80.09 | 81.08 |

Figure 11

COMBINED VISION AND LANGUAGE LEARNING MODELS FOR AUTOMATED MEDICAL REPORTS GENERATION

CROSS-REFERENCE TO RELATED APPLICATIONS

The present application claims the benefit of U.S. Provisional Application No. 63/346,218, filed on May 26, 2022, which is incorporated by reference herein in its entirety.

TECHNICAL FIELD

The present disclosure relates generally to using deep learning models to interpret medical images with natural language.

BACKGROUND

Writing reports by analyzing medical images is prone to errors for inexperienced practitioners and time consuming for experienced ones. Practitioners document operative medical events of patients using hand-written notes, dictation services and/or electronic medical record templates. Filling out medical reports requires expert domain knowledge and is widely perceived as a time-consuming and cumbersome task. Expert physicians usually spend 10 to 20 minutes to populate findings in an electronic template for each patient, consuming a large portion of their working time.

Automated generation of medical reports from images and videos relying on machine learning is a challenging task due to the heterogeneous range of report templates, including close-ended questions, open-ended questions, or both. Moreover, abnormalities in medical images are often subtle and intricately involved with patients' personal history, making them hard to predict and generalize across new patients. Finally, conforming the reports to both institutional and international standards poses a challenge to adoption of automatically generated medical reports.

For these reasons, among others, improvements in building a combined vision and language learning model for automatic generation of medical reports are desired.

SUMMARY

Methods of generating a medical report is presented herein. In some embodiments, the methods include receiving a medical image and at least one natural language medical question, extracting at least one image feature from the image; extracting at least one text feature from the question; and fusing the at least one image feature with the at least one text feature to form a combined feature. Some embodiments further include encoding, by an encoder, the combined feature to form a transformed combined feature; computing a set of prior context features based on a similarity between the transformed combined feature and each of a set of transformed text features derived from a set of training natural language answers; and generating, by a decoder, a first natural language answer conditioned on the transformed combined feature and the set of prior context features.

Systems for generating a medical report are described herein. In some embodiments, the systems include an input interface configured to receive a medical image and at least one natural language medical question; and a memory configured to store a plurality of processor-executable instructions. In some embodiments, the memory includes an encoder module having an image encoder, a text encoder, a bilinear attention network, and an encoder built upon a contrastive learning model; and a decoder module. In some embodiments, the systems further include a processor configured to execute the plurality of processor-executable instructions to perform operations including encoding, by the image encoder, the medical image to form a set of image features; encoding, by the text encoder, the question to form a set of first text features; fusing, by the bilinear attention network, each image feature with each first text feature to form a set of combined features; encoding, by the encoder built on the contrastive learning model, each combined feature to form a corresponding transformed combined feature; computing a set of prior context features based on a similarity between the transformed combined feature and each of a set of transformed text features derived from a set of training natural language answers; and predicting, by the decoder module, a first natural language answer conditioned on the transformed combined feature and the set of prior context features.

In some embodiments a non-transitory processor-readable storage medium storing a plurality of processor-executable instructions for responding to questions about medical images is described. In some embodiments of the storage medium, the instructions are executed by a processor to perform operations including: receiving a medical image and at least one natural language medical question; extracting a set of image features from the image; extracting at least one text feature from the at least one question; fusing the image features and the at least one text feature to form a set of combined features; encoding, by an encoder, the set of combined features to form a set of transformed combined features; computing a set of prior context features based on a similarity between the set of transformed combined features and a set of transformed text features derived from a set of training natural language answers; and predicting, by a decoder, a set of descriptive natural language answers conditioned on the set of transformed combined features and the set of prior context features.

BRIEF DESCRIPTION OF THE DRAWINGS

Illustrative embodiments of the present disclosure will be described with reference to the accompanying drawings, of which:

FIG. 5 includes a table illustrating a summary of VAQ-Rad datasets from 2018 to 2021, according to some embodiments described herein.

FIG. 6 includes a table illustrating classification accuracy of an example CVLL module and other existing methods on the VQA-Rad datasets, according to some embodiments described herein.

FIG. 7 includes a table illustrating BLEU scores (B1-B4) of an example CVLL module and other existing methods for medical report generation on IU-Xray datasets, according to some embodiments described herein.

FIG. 8 includes a table illustrating results of an ablation study of an example CVLL module for conditional language generation on IU-Xray datasets, according to some embodiments described herein.

FIG. 10 illustrates heatmap visualization and comparison between GT answers and answers generated by an example CVLL module for a normal case and an abnormal case, according to some embodiments described herein.

FIG. 11 includes a table illustrating results of an ablation study on VQA-Rad dataset to quantify the effect of pretraining, pre-processing, and contrastive learning.

DETAILED DESCRIPTION

Figure 1A:
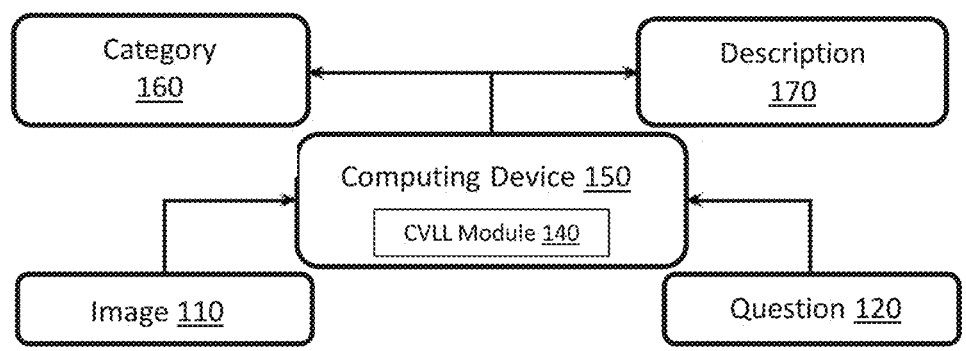
FIG. 1A is a simplified diagram illustrating an example embodiment of a process 100A, according to one or more embodiments described herein.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Seamlessly interpreting and describing images/videos with natural language is a long-standing goal in artificial intelligence. The goal encompasses several related fields including image captioning, image-text retrieval, knowledge-based reasoning and visual question answering. Traditional machine learning approaches to processing vision tasks perform well in classifying images/objects into predefined class categories when plenty of labeled training data is available but struggle otherwise with small-scale data and/or providing interpretable descriptions. Lack of large-scale annotated data is especially relevant in the medical domain due to scarcity of prior knowledge and medical practitioners. Additionally, interpreting medical images may be challenging due to rare and diverse nature of abnormal image features, weak association of image features with text in reports, lack of prior domain knowledge, case-based reasoning, and long descriptions of findings.

The present disclosure provides a deep learning model that combines vision and language modalities to interpret medical images in a visual question answering (VQA) setting and/or using natural language descriptions. In the present embodiments, such combined vision and language learning (CVLL) module (alternatively referred to as a "combined vision and language generator") is based upon an encoder-decoder framework in which the encoder aligns the images with natural language descriptions via contrastive learning, while the decoder predicts answers by conditioning on encoded images and prior context of descriptions retrieved by a nearest neighbor search. In some embodiments, the CVLL module is configured to generate both categorical and natural language-based descriptive answers in a VQA setting. In the present embodiments, the CVLL module is trained by incorporating the encoded image and question features with a bilinear attention network (BAN) model, and subsequently performing self-supervised alignment of shared (or fused) image-question features with corresponding answers (i.e., a set of training answers that correspond to the set of question features provided during the model training process) based on a bidirectional contrastive loss. The decoder then learns the conditional probability distribution to generate natural language-based descriptions for a given image feature based on the encoded image and question features and prior context retrieved from nearest neighboring reports of the image feature.

Compared to existing vision and language models, the CVLL module uses a contrastive learning approach for global alignment of images with text (e.g., training answers) in the encoding phase rather than learning local alignment with the use of masking input parts in the neighborhood. Additionally, the decoder is conditioned on both the image and the nearest retrieved neighbors among the training answers for contextual language generation.

These descriptions are provided for example purposes only and should not be considered to limit the scope of the CVLL module. Certain features may be added, removed, or modified without departing from the spirit of the claimed subject matter.

1. Overview

FIG. 1A is a simplified diagram illustrating an example embodiment of a process 100A, according to one or more embodiments described herein. In the present embodiments, the process 100A describes aspects of using a CVLL module 140 incorporated in a computing device 150 for generating natural language descriptions for a medical image (hereafter referred to as "the image") 110 in response to a natural language-based question (hereafter referred to as "the question") 120 associated with feature(s) present in the image 110. In the present disclosure, the image 110 may be a radiology image or an endoscopic image taken of a patient. In some instances, the image 110 may be captured from a video documenting a medical procedure to which a patient is subjected.

In the present embodiments, the image 110 and the question 120 are received as input data into the computing device 150, and the CVLL module 140, which includes an encoder-decoder framework, is configured to transform the image 110 and the question 120 to vision and language feature representations, respectively. In some embodiments, the question 120 is a close-ended question 120a (see FIG.

1B for a specific example) that solicits a "yes"/"no" answer or a multiple-choice answer. In some embodiments, the question 120 is an open-ended question 120*b* (see FIG. 1B for a specific example) designed to inquire findings, impressions, or procedures regarding features present in the image 110.

The CVLL module 140 subsequently generates, through a conditional natural language decoder, a categorical answer 160 and/or a natural language-based description (hereafter referred to as "the descriptive answer") 170 corresponding to the question 120. In this regard, the categorical answer 160 corresponds to the close-ended question 120*a* and the descriptive answer 170 corresponds to the open-ended question 120*b*. Compared to existing approaches, which are generally task-specific, the CVLL module 140 may operate in a multi-task setting where each report answer (i.e., the categorical answer 160 or the descriptive answer 170) is predicted in the same manner via VQA.

Figure 1B:
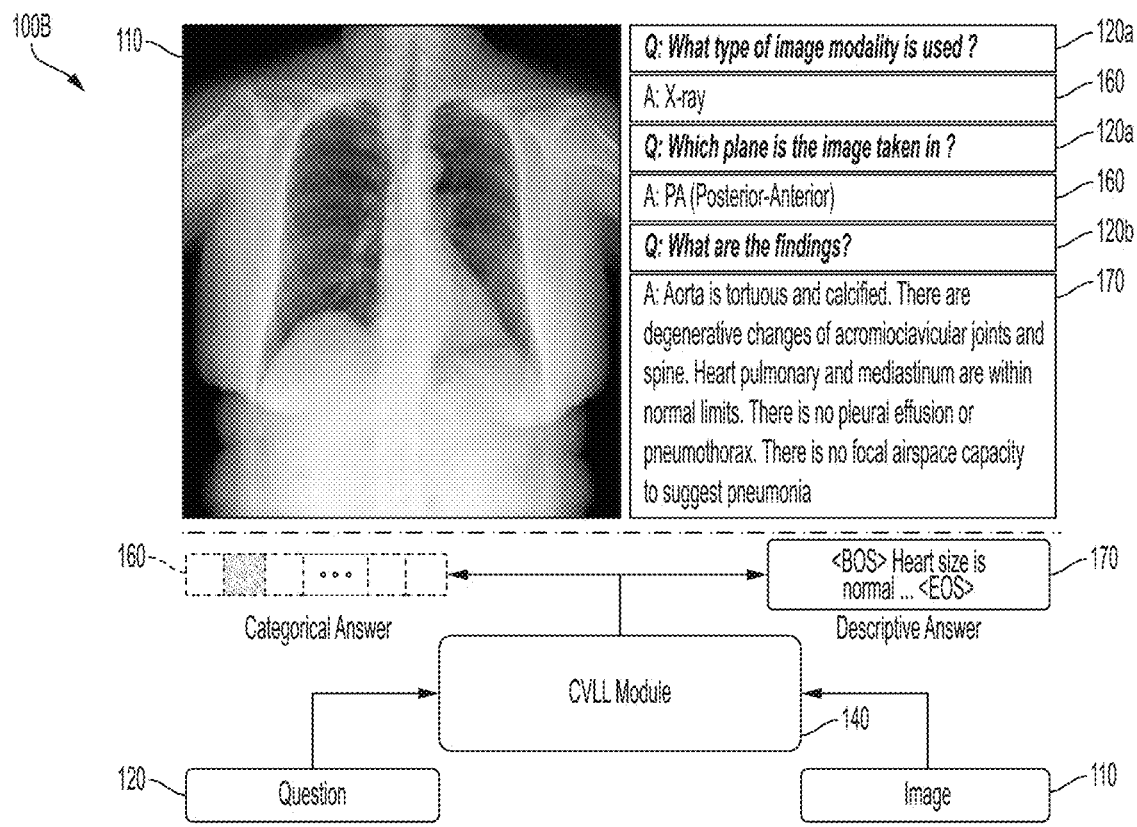
FIG. 1B is a simplified diagram illustrating an example embodiment of a process 100B, according to one or more embodiments described herein.

FIG. 1B illustrates a process 100B that exemplifies aspects of the process 100A, according to one or more embodiments described herein. A chest X-ray image, corresponding to the image 110, and a set of questions, including the close-ended questions 120*a* and/or open-ended questions 120*b*, are received by the CVLL module 140. The CVLL module 140 evaluates the image 110 and predicts the categorical answers 160 and/or the descriptive answers 170, thereby automatically generating a medical report that documents the patient's medical conditions.

In accordance with embodiments of the present disclosure, methods provided herein aim to train the CVLL module 140 for automatically generating a report including a set of natural language answers to accurately describe aspects of a medical image. According to some embodiments, the CVLL module 140 operates on an encoder-decoder framework that provides a contrastive metric learning model for aligning the paired images and report answers (i.e., training answers) in an embedding space, and retrieves nearest neighbor report answers to incorporate prior knowledge with a decoder. Aspects of the CVLL module 140 during inference are also demonstrated herein using benchmark datasets such as VQA-Rad and IU-Xray.

2. Combined Vision and Language Learning (CVLL) Module

Figure 2:
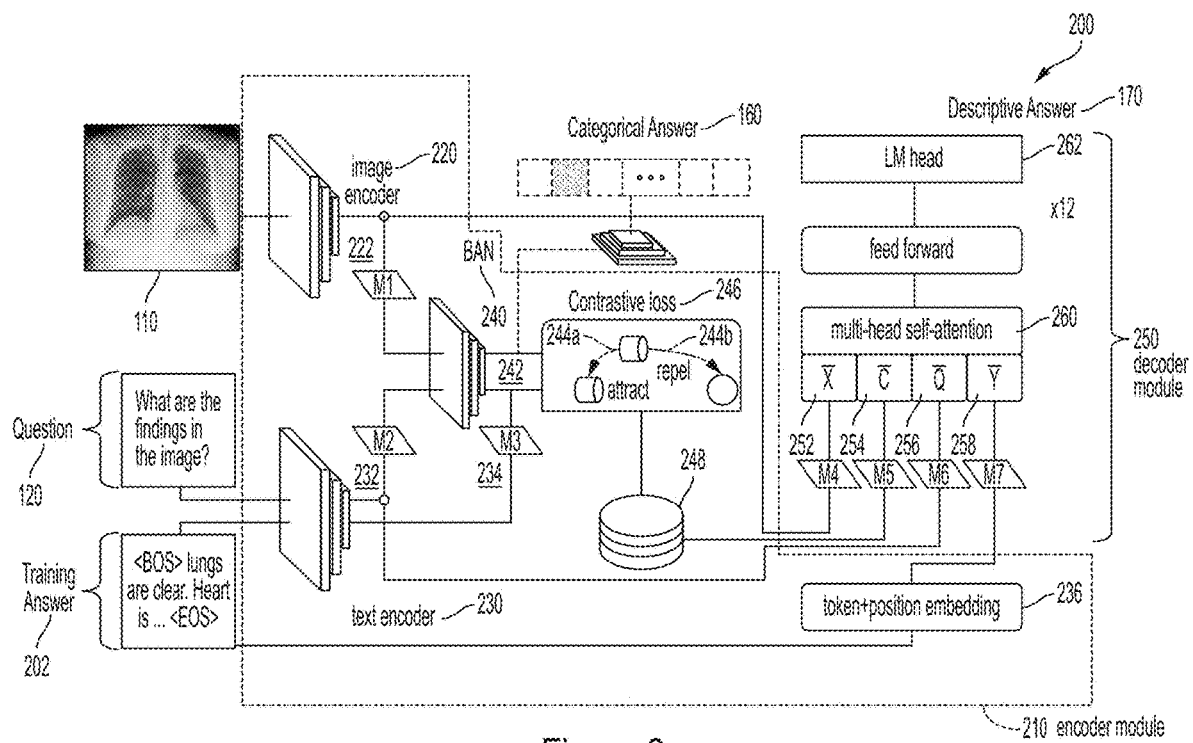
FIG. 2 is a schematic diagram illustrating an example framework of an example embodiment of a combined vision and language learning (CVLL) module for generating a medical report, according to one or more embodiments described herein.

FIG. 2 is a schematic diagram illustrating an example framework of a CVLL module 200 (similar to the CVLL module 140 discussed above) for generating a medical report that includes predicted answers to a set of questions inquiring various aspects of a medical image. In the present embodiments, the CVLL module 200 includes an encoder-decoder framework in which an image encoder 220 and a text encoder 230 are configured to map their respective datasets (e.g., the image 110, the question 120, and a training answer 202) to a hidden state, fusing the resulting image feature representations (alternatively referred to as "image features") 222 with question feature representations (alternatively referred to as "question features") 232 to form combined features 242 using the BAN 240, align the combined features 242 with training answer feature representations (alternatively referred to as "training answer features") 234 using a contrastive learning model 245 (see FIG. 3). In the present embodiments, the image features 222, the question features 232, and the training answer features 234 are attended using learnable weights M1, M2, and M3, respectively, before being fused and/or aligned. In addition to being used to train the contrastive learning model 245, the question features 232 may be directly fed to the decoder module 250 for conditioning the language model. In some embodiments, features of the training answer 202 are projected onto a combined token and position embedding space 236 before being passed through the decoder language model, such as a GPT-2 model.

During the encoding phase of training the CVLL module 200, a bidirectional encoder loss 246 is computed from the contrastive alignment process and minimized by maximizing similarity between positive samples 244*a* (i.e., pairs of the combined features 242 and the training answer features 234 that naturally occur together) against negative samples 244*b* (i.e., pairs of the combined features 242 and training answer features 234 that differ from each other). In some embodiments, a set of prior context features 254 is computed by maximizing cosine similarity between the combined features 242 and the training answer features 234 and computing a top-k nearest neighbor search.

Subsequently, a decoder module 250, which includes a stack of transformer-based blocks, implements a unidirectional self-attention layer 260 for each block. The conditional probability distribution of a set of target answer features corresponding to a set of descriptive answers 170 is then computed (utilizing a language model (LM) head 262, for example) and maximized based on the attended image features 252, attended prior context features 254, attended question features 256, and attended training answer features 258. As depicted in FIG. 2, the attended image features 252, attended prior context features 254, attended question attended 256, and attended training answer features 258 are obtained using learnable weights M4, M5, M6, and M7, respectively. Model parameters for the CVLL module 200 are updated based on the contrastive loss 246 and a decoder loss. In some embodiments, instead of natural language descriptions comprising multiple sentences, the CVLL module 200 generates output (i.e., the categorical answers 160) that classifies the image 110 into one or more categories. During training, pre-trained vision (or image) and language (or text) encoder models may be adapted in an end-to-end manner for contrastive encoding and conditional decoding with a small amount of image-text pairs. During natural language generation, the output text sequence may be generated in an auto-regressive manner with greedy or beam search decoding, and the text sequence generation is stopped once a special end of text token (EOS) is predicted. Aspects of the example CVLL module 200 are discussed in detail below.

In the present embodiments, still referring to FIG. 2, the CVLL module 200 is provided with the image 110 denoted by x, where x may be within a set of images x∈X, and a set of the questions 120 each denoted by q, where q={$q_1$ ... $q_s$}∈Q and s is the number of the questions 120 in the medical report, for the purpose of generating a medical report that comprises target answers, each denoted by y and corresponding to the questions 120, where y={$y_1$ ... $y_s$}∈Y. As discussed above, each target answer $y_i$ may be close-ended belonging to a fixed possible set of answers (i.e., the categorical or classification answer 160) or open-ended comprising multiple natural language sentences (i.e., the descriptive answer 170) that may be conditionally independent. Each open-ended descriptive answer 170 includes a string of words each denoted by w ∈ V and belongs to a known natural language vocabulary. Embodiments of the present disclosure seek to learn model parameters Θ to maximize the conditional likelihood $P_\Theta(y_i|x, q_i)$ of predicting the descriptive answers 170 for a given image 110 and a set of questions 120, $$\Theta = \arg\max_{\Theta} \sum_{i=1}^{s} \log \mathcal{P}_{\Theta}(y_i|x, q_i). \quad (1)$$

In the present embodiments, the image encoder 220 and the text encoder 230 utilize a function $f_{\theta_{enc}}: \{X, Q\} \rightarrow \{\overline{X}, \overline{Q}\} \in \mathbb{R}^{\{n_x, n_q\} \times \{d_x, d_q\}}$ to transform the image 110 and the question 120 to a joint cross-aligned visual and language representation space with $n_x$ image pixels/regions, $n_q$ text tokens, and $\{d_x, d_q\}$ hidden space dimensions of image and text embeddings respectively. The decoder module 250 utilizes a function $h_{\theta_{enc}}: \{\overline{X}, \overline{Q}, \overline{C}\} \rightarrow P(Y)$ to model the conditional probability distribution of predicting the target answer Y given the encoded hidden states $\{\underline{X}, \underline{Q}\}$, and the prior context features 254, denoted by $\overline{C} \in \mathbb{R}^{n_c \times d_c}$, of $n_c$ tokens with dimension $d_c$ that represents the domain specific knowledge for controlled text generation. In some embodiments, it is noted that the prior context features 254 are only needed for generating open-ended descriptive answers 170 and may be omitted for generating the categorical answers 160.

In the present embodiments, large-scale pre-trained models are employed for warm-starting the encoders (i.e., the image encoder 220 and the text encoder 230) and the decoder module 250 model parameters. The resulting encoded image features 222 and question features 232 are fused with a BAN model 240 to form the combined features 242, and the combined features 242 are globally aligned with the natural language training answer features 234 via the contrastive learning model 245. In some embodiments, the combined features 242 are mapped to an output layer of all possible close-ended answers to obtain the categorical answers 160 without undergoing the decoding process. For open-ended answers (i.e., the descriptive answers 170), the decoder module 250 retrieves the prior context features 254 as the nearest neighboring answers of the encoded image features 222, and greedily maximizes the learned conditional distribution $P_{\theta_{dec}}(Y_t|Y_{0:t-1}, \overline{X}, \overline{Q}, \overline{C})$ to generate the answer sequence $Y_{1:t}$ in an auto-regressive manner.

3. CVLL Module-Contrastive Vision and Language Encoder

In the present embodiments, referring to FIG. 2, the CVLL module 200 includes a contrastive vision and language encoder module (alternatively referred to as the "image-text encoder") 210 having four constituent parts, including the image encoder 220, the text encoder 230, the BAN model 240, and the contrastive learning model 245.

3.1 Image Encoder

As discussed above, the image encoder 220 is configured to extract the image features (alternatively referred to as "visual features") 222. In the present embodiments, the image encoder 220 utilizes a pre-trained model, such as the ResNeXt-101 model, as the base image encoder. Some modifications to the ResNeXt-101 may include removing the last linear and pooling layer and adding a 2D adaptive average pooling layer to resize the image 110 to a fixed feature space of 14×14×2048 that preserves the correspondence between the image features 222 and the image 110 ($n_x$=196, $d_x$=2048). Moreover, additional image transformations, including color jittering, normalization, random erasing, are introduced to augment the training data distribution within each batch before extracting the image features 222.

3.2 Text Encoder

The text encoder 230 is configured to tokenize and contextualize the questions 120 and training answers 202 to extract the question features 232 and the training answer features 234, respectively. In the present embodiments, the text encoder 230 is based on a pre-trained, natural language-based BERT model, which is configured to predict masked words locally based on the context provided by other non-masked words in a sentence. The BERT model comprises a stack of transformer-based residual encoder blocks each including a bidirectional self-attention and a feedforward layer, along with a residual connection in between and a layer-normalization step. The bidirectional self-attention layer connects each input vector with all other input vectors to form a context-dependent vector representation for each input text sequence in the questions 120 and the training answers 202. Successive encoder blocks further refine the contextual representation to handle indirect textual dependencies.

In some embodiments, the text data are first augmented by applying a transformation function from one of Word2Vec, WordNet, synonym replacement, random deletion, random swap, random insertion, followed by filtering out punctuation marks. A WordPiece algorithm may then be used to tokenize the text before extracting the textual features (i.e., the question features 232 and training answer features 234).

3.3 BAN Model

In the present embodiments, the cross-modal encoded image features 222 and question features 232 are fused by the BAN model 240 to form the combined features 242. In existing implementations, outer product or the bilinear product exhaustively combines multi-modal features at the cost of high computational complexity, while naive concatenation or inner product may be suboptimal due to limited cross-modal interaction between the features. Compared to other co-attention mechanisms, the BAN model 240 exploits bilinear interaction maps where each feature $f_k$ is pooled by low-rank bilinear approximations, i.e., $$f_k = (\overline{X}U)_k^T A_{BA}(\overline{Q}V)_k, \quad (2)$$

$$A_{BA} = \text{softmax}(((1 \cdot P_g^T) \circ \overline{X}U)V^T\overline{Q}^T), \quad (3)$$

where $A_{BA}$ represents the bilinear attention maps, $1 \cdot p_q^T \in \mathbb{R}^{K \times d_x}$ is obtained from learnable projection vectors $p_g \in \mathbb{R}^{d_x}$ with glimpse index g, while $\{U, V\} \in \mathbb{R}^{\{d_x \times d_q\} \times K}$ are linear embedding matrices of rank K with column index denoted as k, and $\circ$ is the element-wise multiplication operator. Residual learning on top combines multiple bilinear attention maps for effective joint representation of question and image features. It is noted that fusing the encoded features using the BAN model 240 may be omitted if the questions 120 are not provided, as in the case of natural language description of images only (i.e., not in a VQA setting). For the sake of brevity, the combined features 242 are denoted as X in the following portion of the disclosure.

3.4 Contrastive Learning Model

Various existing approaches to performing VQA learning tend to ignore the semantic representation of the training answers (i.e., the training answers 202), and rely only on the encoded image (and question) features (i.e., the image features 222 and question features 232) from pre-trained models. In contrast, the present embodiments align images (fused with questions) with natural language-based training answers via a bidirectional contrastive learning model 245 (see FIG. 3). In some embodiments, the contrastive learning model 245 provides a joint embedding space that pulls together naturally occurring image (and question)-answer pairs as the positive samples 244a, while pushing away observations that correspond to different image (and question)-answer pairs as negative samples 244b. Each directional contrastive loss maximizes the mutual information between the positive samples 244a in an embedding space, thereby encouraging a set of positive samples 244a to be distinguished amongst a set of unrelated negative samples 244b using a cross-entropy loss formulation.

In the present embodiments, implementing the contrastive learning model 245 includes first projecting the encoded image (and question) $\overline{X}$ and the natural language training answer features 234, where $\overline{Y} \in R^{n_y \times d_y}$ with $n_y$ tokens of dimension $d_y$, to a d-dimensional space with a linear transformation to $\hat{X} \in R^d$ and $\hat{Y} \in R^d$, respectively, $$\hat{X} = W_x^T [\text{AvgPool}(\overline{X})], \; \hat{Y} = W_y^T [\text{AvgPool}(\overline{Y})], \quad (4)$$

where AvgPool represents the well-known average pooling function, $W_x, W_y \in R^{(d_x \times d_y) \times d}$ are learnable projection matrices, and the embeddings X and Y are averaged across all pixels and tokens before the transformation, respectively.

During training, a first directional contrastive loss 246a operates on a mini-batch of Nr image (and question)-answer pairs $\{\hat{x}_i, \hat{y}_i\}_{i=1}^{N_T}$, where each pair is in turn taken as the positive sample 244a to maximize agreement against all other negative samples 244b, i.e., $$\mathcal{L}_{\hat{x} \to \hat{y}} = -\frac{1}{N_T} \sum_{i=1}^{N_T} \log \frac{\exp(\langle \hat{x}_i, \hat{y}_i \rangle / \tau)}{\sum_{j=1}^{N_T} \exp(\langle \hat{x}_i, \hat{y}_j \rangle / \tau)}, \quad (5)$$

where $$\langle \hat{x}, \hat{y} \rangle = \frac{\hat{x}^T \hat{y}}{\|\hat{x}\| \|\hat{y}\|}$$

represents the cosine similarity distance and $\tau \in R^+$ represents the temperature parameter to scale the similarity metric. Similarly, a second directional contrastive loss 246b on $N_T$ answer-to-image (and question) pairs $\{\hat{y}_i, \hat{x}_i\}_{i=1}^{N_T}$ is computed as $$\mathcal{L}_{\hat{y} \to \hat{x}} = -\frac{1}{N_T} \sum_{i=1}^{N_T} \log \frac{\exp(\langle \hat{y}_i, \hat{x}_i \rangle / \tau)}{\sum_{j=1}^{N_T} \exp(\langle \hat{y}_i, \hat{x}_j \rangle / \tau)}. \quad (6)$$

to account for the asymmetry with respect to each input modality. Accordingly, an overall bidirectional encoder loss 246, denoted as $L_{enc}$, is the sum of the two constituent, directional contrastive losses weighted by constant $\alpha_l \in R^+$, $$L_{enc} = \alpha_l (L_{\hat{x} \to \hat{y}} + L_{\hat{y} \to \hat{x}}). \quad (7)$$

3.5 Prior Context Knowledge

When training the contrastive learning model 245, normalized natural language answers of the train set $\hat{Y}_{train}$ are stored in a database 248. We then compute top-k nearest neighbors $\underline{C}$ (i.e., the prior context features 254) that maximize a cosine similarity between a given encoded image $\hat{X}$ and the stored natural language answers $\hat{Y}_{train}$. In the present embodiments, the scalable nearest neighbor search is performed using the FAISS library to retrieve reports that provide a case-based reasoning mechanism to inject prior domain knowledge from relevant cases in generating natural language descriptions, i.e., $$\overline{C} = \text{topk} \left[ \max_{i \in \hat{Y}_{train}} \langle \hat{X}, \hat{Y}_{train}^{(i)} \rangle \right]. \quad (8)$$

Topk represents the well-known function that returns a specified number of top-ranked values. The prior context aids the decoder to attend to longer horizon dependencies and get additional case-based details for controlled text generation. This is particularly relevant in describing medical images with specific terminologies, writing style and class imbalanced abnormalities.

4. CVLL Module—Conditional Language Decoder

With respect to the decoder module 250, the probability distribution of generating the output text sequence $Y_{1:t}$ corresponding to the descriptive answer 280 and conditioned on the contextualized encoding sequence $P_{\theta_{dec}}(Y_{1:t} | \underline{X}, \underline{C})$, can be decomposed into a product of conditional distributions using Bayes' rule, $$\mathcal{P}_{\theta_{dec}}(Y_{1:t} | \overline{X}, \overline{C}) = \prod_{i=1}^{t} \mathcal{P}_{\theta_{dec}}(y_i | y_{0:i-1}, \overline{X}, \overline{C}). \quad (9)$$

where $y_0 = (\text{BOS})$ is a special token reserved for the beginning of a sentence.

4.1 Natural Language Generation

In some embodiments, similar to the constituents of the vision and language encoder, the decoder module 250 implements the conditional language generation with a stack of transformer-based blocks. Different from the vision and language encoder, the decoder module 250 learns to predict the next target vector $y_i$ and not the input vector itself. Accordingly, the next word prediction depends upon the previously generated sequence $y_{0:i-1}$ that is implemented with the unidirectional self-attention layer 260 within each block. Unidirectional self-attention layer 260 masks out the contribution from all future tokens during training, and only takes into account the input sequence up to the last target vector $y_{0:i-1}$.

The stack of decoder blocks is followed by a dense layer, namely the language model head (LM Head) that maps the output sequence $y_{0:i-1}$ to a probability distribution over the words in the vocabulary. In the present embodiments, a GPT-2 model is used as the pre-trained natural language model decoder modified for conditioning on image features and prior context features. In some embodiments, the GPT-2 model is trained on 40 GB of Internet text and includes 12 layers each containing 12 heads with a hidden dimension of 768 units, for a total of 117M parameters. In some embodiments, the GPT-2 model has 50, 257 nodes representing the English vocabulary under byte pair encoding.

Finally, the conditional probabilities of all output text sequences $Y_{1:t}$ of the decoder module 250 are multiplied and subsequently maximized to learn the conditional probability distribution of the target sequence in the descriptive answer 280. In some embodiments, the conditional probability distribution is computed with the cross-entropy loss after applying dynamic padding on the ground-truth and the predicted sequences. In the present embodiments, the training of the decoder module 250 involves learning the decoder parameters via teacher forcing where a target word is passed as the next input to the decoder module 250 and the cross-entropy loss is used to backpropagate the error between the ground-truth and the target sequences.

4.2 Conditional Decoding

In the present embodiments, the goal of conditional language decoding is to learn conditional probability P (Y|X, C) from small amount of {X, C, Y} pairs, given an initial pre-trained model P (Y). It is noted that adapting a pre-trained language model to an arbitrary conditional input is a non-trivial task. Naively concatenating the inputs may further degrade the performance of the pre-trained model. Alternatively, a separate context attention layer in each block may be used to combine the multi-modal features, though not without the risk of tuning weights from scratch that may hamper the overall performance. In the present embodiments, the conditioning encoder inputs are directly added into the pre-trained self-attention layers of the model, thereby adding the attention outputs for different conditional inputs with a parsimonious increase in the number of parameters only.

In some embodiments, the encoded input text sequence $\underline{Y}$ is linearly projected to the query, key, and value vectors using respective projection matrices $\{W_{qy}, W_{ky}, W_{vy}\} \in R^{d_y \times d_h}$ of a decoder block. The conditioning encoder inputs X (i.e., the encoded, combined image features 222 and questions features 232) and $\underline{C}$ (i.e., the prior context features 254) are then added to the key and the value vectors using pairs of projection matrices $\{W_{kx}, W_{vx}\} \in R^{d_x \times d_h}$ and $\{W_{kc}, W_{vc}\} \in R^{d_c \times d_h}$. The multi-modal self-attention matrix $A(\underline{Y}, \underline{X}, \underline{C})$ for a decoder block may then be represented as a scaled dot-product, $$\mathcal{A}(\overline{Y}, \overline{X}, \overline{C}) = sm\left((\overline{Y}W_{qy})\begin{bmatrix}\overline{Y}W_{ky}\\\overline{X}W_{kx}\\\overline{C}W_{kc}\end{bmatrix}^\top\right)\begin{bmatrix}\overline{Y}W_{vy}\\\overline{X}W_{vx}\\\overline{C}W_{vc}\end{bmatrix}, \quad (10)$$

where sm is short for the well-known softmax operator. For multi-head attention $A_M$ with H parallel attention heads, the multi-modal self-attention matrices $\{A_h\}_{h=1}^{H}$ are estimated for each parallel head separately and combined using the projection matrix $W_o$, $$A_M(\overline{Y}, \overline{X}, \overline{C}) = [A_1 A_2 \ldots A_H] W_o. \quad (11)$$

In the present embodiments, the pre-trained natural language model (e.g., the GPT-2 model) is modified to incorporate two conditional inputs: image features X to describe the visual findings, and prior context C to inject domain specific knowledge in natural language generation. The prior context C aids the decoder module 250 to attend to longer horizon dependencies and get additional case-based details for controlled text generation.

5. Computing Device

Figure 3:
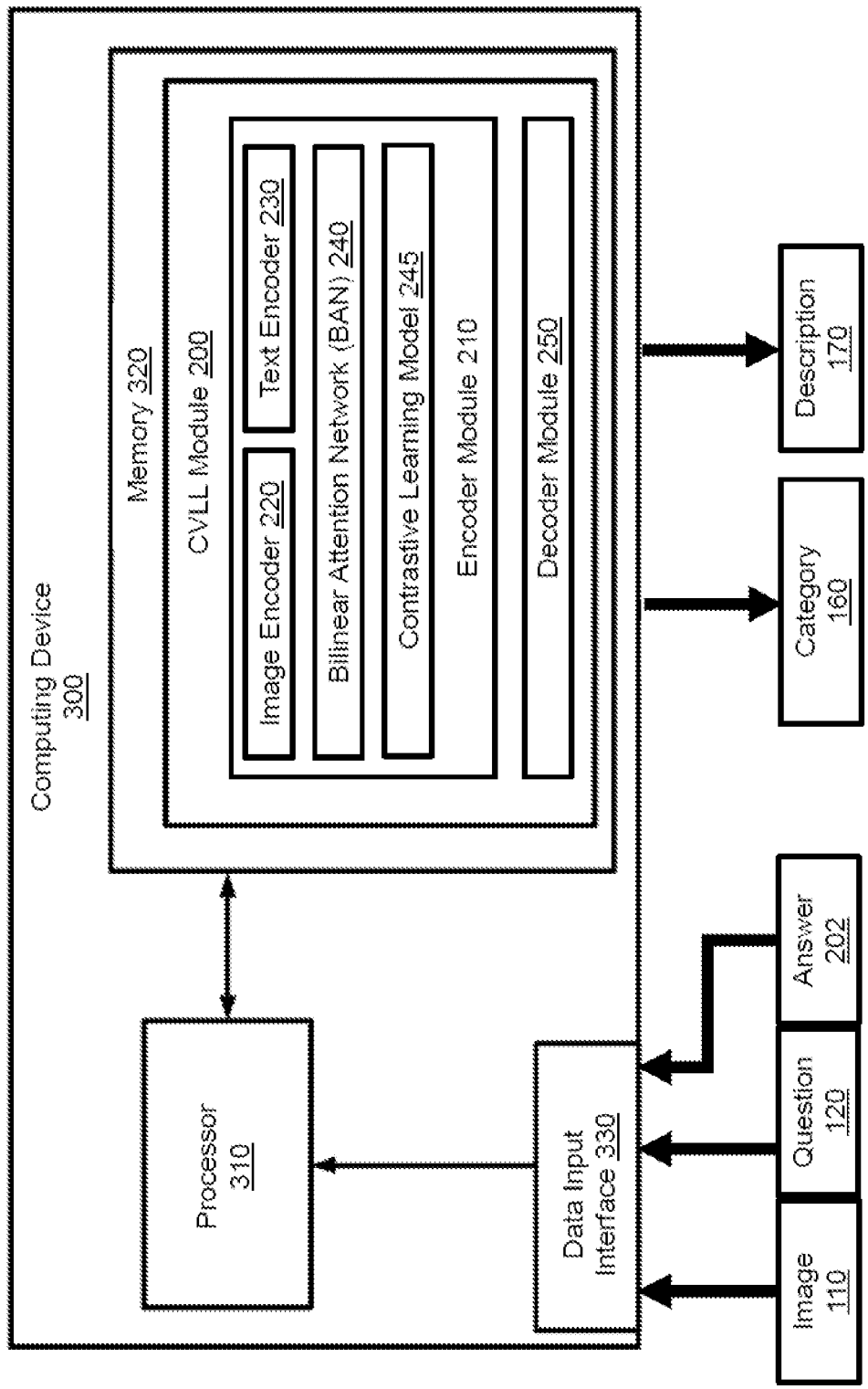
FIG. 3 is a simplified diagram of a computing device for implementing an example CVLL module, according to one or more embodiments described herein.

FIG. 3 is a simplified diagram of a computing device 300 (similar to the computing device 150 discussed above) for implementing the CVLL module 200, according to one or more embodiments described herein. In some embodiments, the computing device 300 includes a processor 310 coupled to memory 320. Operations of the computing device 300 are controlled by the processor 310. And although the computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in the computing device 300. The computing device 300 may be implemented as a stand-alone subsystem, as a board added to a computing device, and/or as a virtual machine.

The memory 320 may be used to store software executed by computing device 300 and/or one or more data structures used during operation of computing device 300. The memory 320 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor (e.g., the processor 310) or computer is adapted to read. In the present embodiments, for example, the memory 320 includes instructions suitable for training and/or using the CVLL module 200 described herein.

The processor 310 and/or the memory 320 may be arranged in any suitable physical arrangement. In some embodiments, the processor 310 and/or the memory 320 are implemented on the same board, in the same package (e.g., system-in-package), on the same chip (e.g., system-on-chip), and/or the like. In some embodiments, the processor 310 and/or the memory 320 include distributed, virtualized, and/or containerized computing resources. Consistent with such embodiments, the processor 310 and/or the memory 320 may be located in one or more data centers and/or cloud computing facilities.

In some examples, the memory 320 may include non-transitory, tangible, machine readable media that includes executable code that when run by one or more processors (e.g., the processor 310) may cause the one or more processors to perform the methods described in further detail herein. For example, as shown, the memory 320 includes instructions for an online adaptation module that may be used to implement and/or emulate the systems and models, and/or to implement any of the methods described further herein. In some examples, the CVLL module 200 may receive an input that includes the image 110, the question 120, and the training answer 202 via a data input interface 330. The CVLL module 200 may then generate one or more output data, such as the categorical answer 160 and/or the descriptive answer 170, in response to the input data.

In the present embodiments, the CVLL module 200 includes at least the encoder module 210 and the decoder module 250 as discussed in detail above. The encoder module 210 further includes the image encoder 220, the text encoder 230, a BAN model 240, and a contrastive learning model 245. In some examples, the CVLL module 200 and its components may be implemented using hardware, software, and/or a combination of hardware and software.

Some examples of computing devices, such as the computing device 300, may include non-transitory, tangible, machine-readable media that include executable code that when run by one or more processors (e.g., the processor 310) may cause the one or more processors to perform the processes of method 400 described below. Some common forms of machine-readable media are discussed in detail above.

Figure 4A:
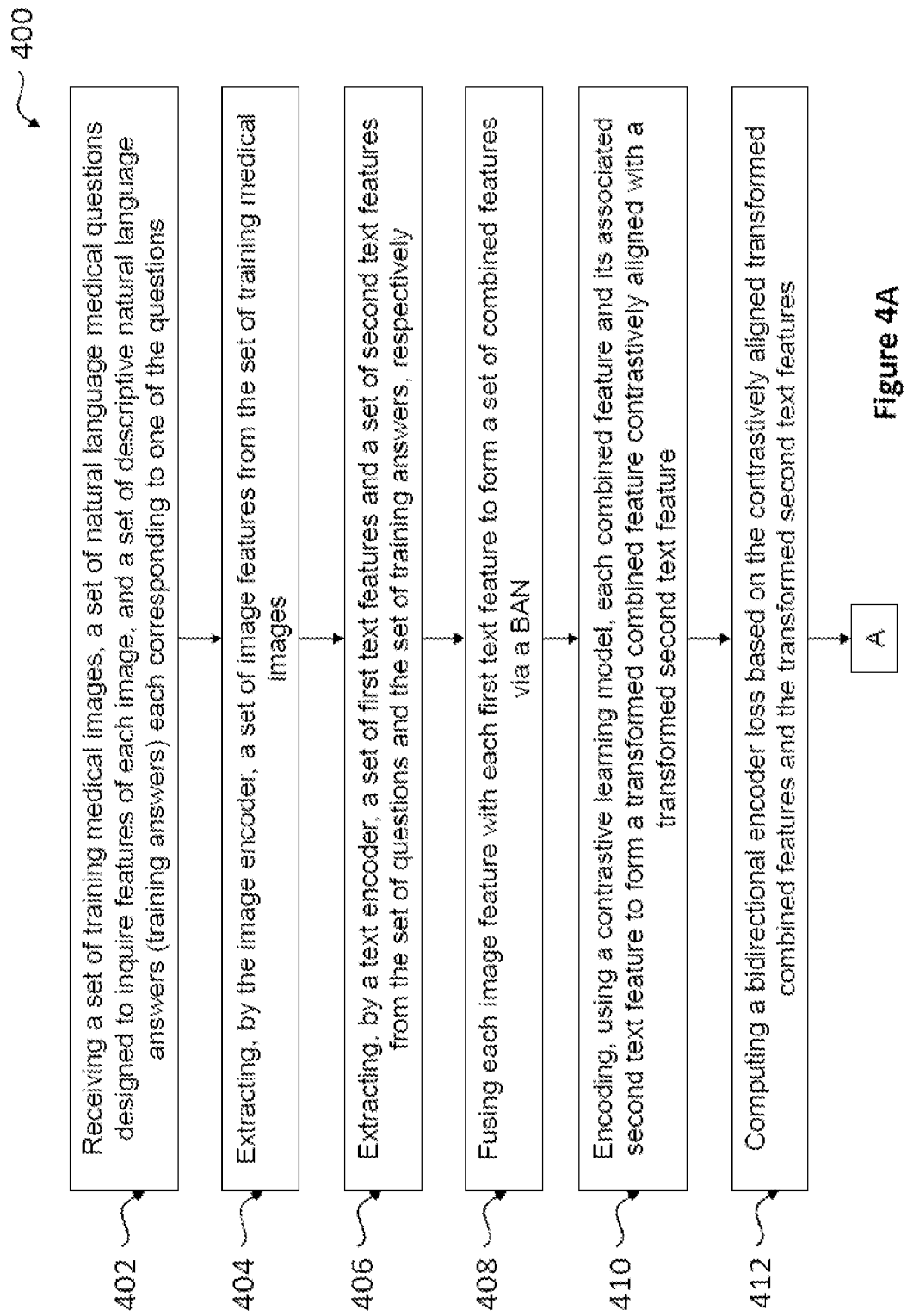
FIGS. 4A and 4B illustrate a simplified logic flow diagram illustrating an example method of training an example CVLL module, according to some embodiments described herein.
Figure 4B:
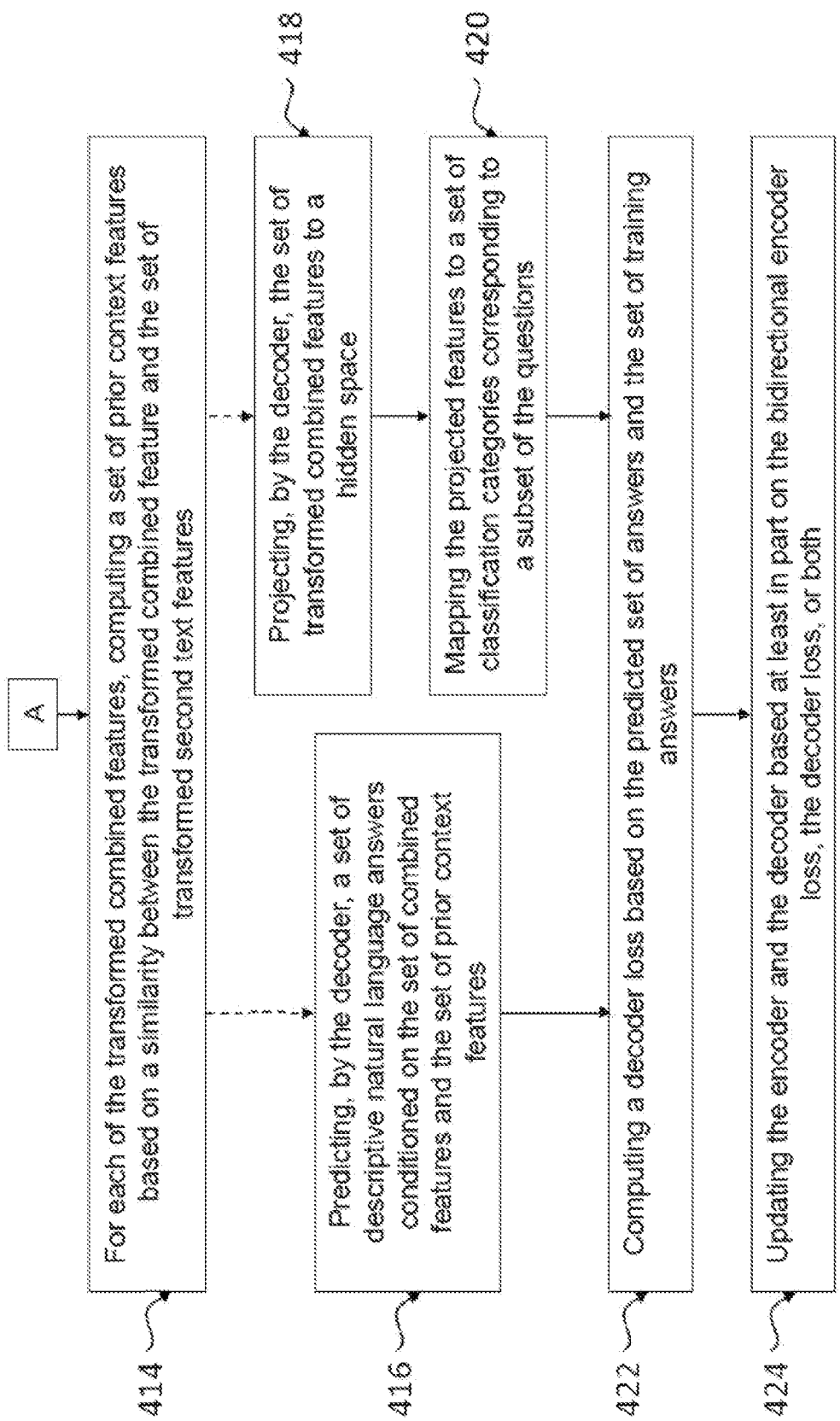

FIGS. 4A and 4B illustrate a simplified logic flow diagram illustrating a method 400 of training the CVLL module 200, according to some embodiments described herein. One or more of the processes of the method 400 may be implemented, at least in part, in the form of executable code stored on non-transitory, tangible, machine-readable media that when run by one or more processors may cause the one or more processors to perform one or more of the processes.

At step 402, the set of training medical images ("images") 110, the set of natural language medical questions ("questions") 120 designed to inquire features of each image 110, and a set of descriptive natural language answers ("training answers") 202 each corresponding to one of the questions 120 are received at the data input interface 330.

At step 404, the image features 222 are extracted (or encoded) from the images 110 using the image encoder 220.

At step 406, the question features 232 and the training answer features 234 are extracted from the questions 120 and the training answers 202, respectively.

At step 408, the image features 222 and the question features 232 are fused to form combined features 242 using the BAN model 240.

At step 410, each combined feature 242 and its corresponding training answer feature 234 are transformed and aligned in a cross-modal joint embedding space using the contrastive learning model 245.

At step 412, the bidirectional encoder loss 246 is calculated based on the aligned combined features 242 and the corresponding training answer feature 234.

At step 414, for each of the transformed combined features 242, the prior context features 254 among the transformed training answer features 234 are computed using a nearest neighbor search.

At step 416, the descriptive answers 170 conditioned on the combined features 242 and the prior context features 254 are predicted using the decoder module 250.

At step 422, the decoder loss is computed based on the predicted descriptive answers 170 and the training answers 202.

At step 424, components of the encoder module 210 (e.g., the contrastive learning model 245) and the decoder module 250 are updated based on the bidirectional encoder loss 246 and/or the decoder loss.

At steps 418 and 420, which are performed in addition to or instead of steps 416, 422, and 424, the transformed combined features 242 are projected to a hidden space using the decoder module 250, and the projected combined features 242 are mapped to a set of classification categories to obtain the categorical answer 160. Parameters of the categorical answer prediction module may be updated using the same calculated cross-entropy loss formulation as used in predicting the descriptive answers 170.

Once the model is trained, the model enters an inference phase in which a subset of the steps in FIGS. 4A and 4B may be performed. For example, computing encoder and decoder losses (e.g., steps 412 and 422) may no longer be performed. In addition, updates to the encoder and decoder based on losses (e.g., step 424) may no longer be performed. And, as would have been understood by a person of ordinary skill, once a set of training images, questions, and a set of training answers is received, one or more of these items may be stored for future use by a trained encoder and/or decoder. In operation, the trained system may receive a medical image and at least one natural language medical question (e.g., related to the medical image), and the system will produce a natural language output that represents a response to the question. The extracting and fusing steps (e.g., steps 404, 406, 408) operate on the medical image and the at least one natural language medical question. The step of computing a set of prior context features, as explained herein (e.g., $\overline{C}$ 254 in FIG. 2), is based on a similarity between a transformed combined feature and each of a set of transformed text features derived from the previously stored set of training natural language answers. Then a decoder generates or predicts a natural language answer conditioned on a transformed combined feature and the set of prior context features.

In some embodiments of the method, computing the set of prior context features includes one or more of the following: receiving the set of training natural language answers, each corresponding to one of a set of training medical images and one of a set of training natural language questions, extracting a set of text features from the set of training natural language answers, applying a second encoding projection matrix to the set of text features to generate the set of transformed text features, storing the set of transformed text features in a database, and maximizing a cosine similarity between the transformed combined feature and the set of transformed text features in the database using a top-k nearest context neighbor search.

6. Example Performance

The present disclosure further provides evaluation of performance of the CVLL module 200 in understanding visual concepts and describing them with natural language. To best decouple the performance effects of the encoder module 210 and the decoder module 250, sample experiments in a VQA setting are discussed below. Specifically, a sample experiment during which the CVLL module 200 is simplified to choose from a set of known answers (i.e., generating a categorical answer 160) is discussed. Further, a sample experiment aimed at describing medical images with natural language sentences (i.e., generating a descriptive answer 170) is discussed. The sample experiments were performed on two benchmark public datasets, namely VQA-Rad for VQA and IU-Xray for medical report generation.

Performance of the CVLL module 200 is evaluated based on the following aspects: how feasible it is to adapt the pre-trained language and vision models in describing small set of medical images, what is the role of contrastive encoding in learning joint visual linguistic representations, does conditional decoding on image features and prior context help with generating more relevant natural language descriptions, and how the CVLL module 200 fares in performance among the existing approaches for VQA and medical report generation.

7. Example Performance—VQA with VQA-Rad Dataset

VQA-Rad 2018 is the first manually annotated dataset of medical VQA on radiology images. Newer versions have been subsequently released every year from 2018 to 2021 (see the table depicted in FIG. 5). The table in FIG. 5 shows numbers of images (Im) and question-answer pairs ("QA") in train and evaluation ("eval") sets, and numbers of classes $N_c$ and unseen instances in train $U_A^{(Train)}$ and evaluation sets $U_A^{(Eval)}$, respectively, as minimum occurrence $M_o$ of instances per class category increases from 0 to 5 and then to 10. It is noted that class imbalance and unseen answers in the evaluation set present challenges for VQA approaches.

To evaluate the performance of the CVLL module 200, an aggregated dataset, VQA-Rad All, is introduced herein that combines all the VQA-Rad datasets from 2018 to 2021. The standard train-eval splits provided with the datasets are used herein. Radiology images in the datasets are taken from open-access MedPix database, and the questions are predominantly posed from categories, such as image plane, imaging modality, organ system involved and image abnormalities. Questions can be close-ended or short open-ended answers of a few words. The VQA problem is posed as a multi-class classification over all possible sets of answers.

7.1 Experimental Setup

The WordPiece tokenization method with a max token length of 12 and a pre-trained BioBert, which is a BERT model trained on PubMed articles, are used to warm-start the text encoder 230. The image features 222 and the question features 232 are pre-processed, encoded, and combined with residual learning on top of BAN model 240 using a glimpse of two projections, before undergoing joint alignment with the training answer features 234 via the contrastive learning model 245. The decoder module 250 projects the encoded sequence to a hidden dimension of 1024 neurons before mapping it to classification categories of size shown in FIG. 5. An Adam optimizer for fixed weight decay (AdamW) with a batch size of 64 and a learning rate of 5e-5 for a total of 200 epochs is employed.

7.2 Metrics

The classification accuracy on the evaluation set is used as the performance metric.

7.3 Baselines

The CVLL module 200 is compared with existing medical VQA approaches from recent years, namely mixture of enhanced visual features (MEVF), multiple meta-model quantifying (MMQ), question conditioned reasoning (QCR), ImageCLEF competitions, contrastive pre-training and representation distillation with conditional reasoning (CRPD).

7.4 Results

The table depicted in FIG. 6 shows that the CVLL module 200 outperforms other competing methods across all the datasets. Specifically, the bottom three rows of the table indicate an increase in minimum occurrence threshold from 0 to 5 and then to 10 instances. Similar to other methods, the CVLL module 200 uses bilinear attention mechanism to fuse the image and the question features. Contrary to other methods, the CVLL module 200 does not use fixed word embeddings (such as Glove) or RNNs for sentence-level representations; instead, it learns the entire contextual embeddings using BERT-style transformers with WordPiece tokenization. Combined with data augmentation strategies and adapting pre-trained models in an end-to-end manner, the overall performance is significantly improved compared to other transfer learning approaches used in the existing methods such as meta-learning, conditional reasoning, image-level contrastive pre-training and knowledge distillation. Noticeably, the classification accuracy produced by the CVLL module 200 on commonly reported VQA-Rad 2018 is at least 1.1.3% more than the next best competing method.

There are two challenging aspects of the VQA-Rad datasets (see FIG. 5): imbalanced number of instances across class categories, and unseen answers in the test set that do not belong to any class category seen in the train set. It is observed from FIG. 6 that simply filtering out instances and class categories with less than 5 and 10 instances per class category $M_o=\{5, 10\}$ proportionally increases the classification accuracy across all datasets, at the cost of reducing the overall number of instances and class categories. Moreover, the unseen answers in the test set contribute to most of the misclassifications and comparatively low classification scores. For example, the VQA-Rad 2020 dataset has 331 class categories and only two categories (yes/no) have more than 10 instances per class, suggesting the need for natural language generation in predicting descriptive answers as discussed below.

8. Example Performance—Medical Report Generation with IU-Xray Dataset

The Indiana University X-ray dataset is a standard benchmark for generating medical reports. The dataset comprises frontal and lateral views of chest X-ray images that are associated with radiology reports. Each report includes three main sections, namely impressions, findings, and manual tags. For purposes of brevity, the CVLL module 200 is only evaluated for its performance in populating the findings section. After omitting the reports without findings section, the remaining 3607 reports are randomly split into 80% training and 20% evaluation sets, with each instance containing a pair of frontal and lateral images, along with the findings section. On average, each report instance has 5.7 sentences, while each sentence has 6.5 words. Following dataset pruning, the reports are pre-processed by converting to lower-cases, removing punctuation marks, and tokenizing the sentences. A maximum number of tokens for a report section is set to 200 and the report findings are zero-padded in case its length is less than the maximum number of tokens.

8.1 Experimental Setup

The pre-trained BERT and GPT-2 models are used as base models for the encoder (e.g., the text encoder 230) and the decoder (e.g., the decoder module 250), respectively. BioBERT or ClinicalBERT does not appear to improve report generation results in the present experiments. Additional parameters for contrastive encoding and conditional decoding are randomly initialized. Two separate optimizers for the encoder and the decoder parameters are employed, and each is configured with the same AdamW optimizer having a batch size of 16 and learning rate of 5e-5 that linearly decays over 100 epochs.

In the training phase, the decoder parameters are learned via teacher forcing where the target word is passed as the next input to the decoder and where cross-entropy loss is used to backpropagate the error between the ground-truth and the target sequences. During inference, the next word is predicted via greedy search in a deterministic manner, while introducing penalties to ensure a minimum length of the sequence is greater than four and words are not repeated in the generation process. Moreover, no performance gains are observed by sampling strategies such as top-k and/or top-k with top-p nucleus sampling. The ground-truth report is used as prior context during training and includes one nearest neighbor report as prior context during evaluation.

8.2 Metrics

A bilingual evaluation understudy (BLEU) score that compares n-gram similarity between the ground-truth and the generated report, where n varies from 1 to 4, is used to evaluate performance of the CVLL module 200. The sentence level BLEU scores computed is calculated using the nltk library.

8.3 Baselines

The CVLL module 200 is compared with existing radiology report generation methods, including Co-Att (see reference [1] below), which is co-attention mechanism on visual and predicted tags embeddings is combined with a hierarchical LSTM for generating words and sequences; HRGR-Agent (see reference [2] below), which is a hybrid between template retrieval and text generation method that is optimized with reinforcement learning; CMAS-RL (see reference [3] below), which is a multi-agent system that cooperates to write normal and abnormal sentences; Mem-T (see reference [4] below), which is a memory-driven transformer language decoder that records key information of the generation process in a relational memory; VTI (see reference [5] below), which is a variational inference method to generate diverse reports; and PPKED (see reference [6] below), which is a posterior and prior knowledge combination method that combines visual features with knowledge graph, medical tags, and prior reports.

[1] Jing, B., Xie, P., Xing, E. P.: On the automatic generation of medical imaging reports. CoRR abs/1711.08195 (2017), http://arxiv.org/abs/1711.08195.

[2] Li, C. Y., Liang, X., Hu, Z., Xing, E. P.: Hybrid retrieval-generation reinforced agent for medical image report generation. CoRR abs/1805.08298 (2018).

[3] Jing, B., Wang, Z., Xing, E. P.: Show, describe and conclude: On exploiting the structure information of chest x-ray reports. CoRR abs/2004.12274 (2020).

[4] Chen, Z., Song, Y., Chang, T., Wan, X.: Generating radiology reports via memorydriven transformer. CoRR abs/2010.16056 (2020).

[5] Najdenkoska, I., Zhen, X., Worring, M., Shao, L.: Variational topic inference for chest x-ray report generation. CoRR abs/2107.07314 (2021).

[6] Liu, F., Wu, X., Ge, S., Fan, W., Zou, Y.: Exploring and distilling posterior and prior knowledge for radiology report generation. In: CVPR. pp. 13753-13762 (2021).

8.4 Results

Results are summarized in the table depicted in FIG. 7. BLEU scores (B1-B4) for medical report generation on IU-Xray dataset are shown in the table. It can be seen that the CVLL module 200 performs significantly better than the existing report generation methods across all the BLEU scores, suggesting the feasibility of adapting large-scale pre-trained, language and vision models on a small set of domain-specific medical data. In comparison to the other approaches, the CVLL module 200 uses contrastive learning in the encoding phase and conditional decoding on visual and prior context features, while retaining the predictive representations of the pre-trained models.

An ablation analysis is conducted to investigate the contribution of each component towards overall performance of the CVLL module 200 in the table depicted in FIG. 8. As shown in the table, the CVLL module 200 is used on IU-Xray dataset with visual features ("Vis"), visual features with contrastive encoding ("Vis+CE"), and visual features with contrastive encoding and prior context ("Vis+CE+PC"). It is observed that the base GPT2 model modified to condition on visual features ("Vis" results) only performs on par with existing methods. Adding contrastive learning ("Vis+CE" results) for joint alignment of the visual and language features in the encoding phase boosts the performance of the natural language decoder. Incorporating prior context experience ("Vis+CE+PC" results) helps in following the writing style of the reports. In other words, BLUE scores are improved with contrastive learning in the encoding phase and with prior context in the decoding phase. In comparison to existing approaches that incorporate domain knowledge via fixed medical tags and medical graphs, the CVLL module 200 employs prior reports that are retrieved from the training set via nearest neighbors of visual features.

Figure 9:
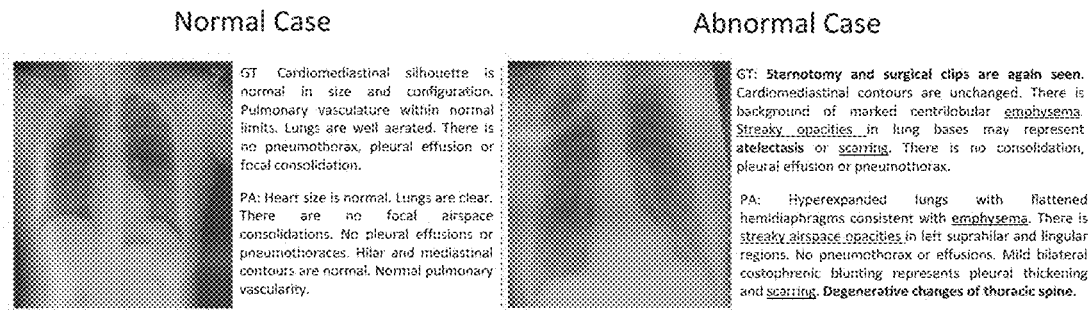
FIG. 9 illustrates heatmap visualization and comparison between ground-truth answers (GT) and answers generated by an example CVLL module for a normal case and an abnormal case, according to some embodiments described herein.

FIG. 9 provides a qualitative comparison between the ground-truth (GT) and the generated report findings (PA), along with the heatmap visualizations using grad-cam for an intuitive understanding of the approach. For normal cases, a strong alignment is observed from the results of the CVLL module 200 in generating report findings. For abnormal cases, part of the findings may be inadvertently omitted and/or added in describing the abnormalities. For example, in the case of abnormal report findings as depicted, the underlined text indicates abnormalities, and the bold text indicates misalignment.

FIG. 10 illustrates heatmap visualization and comparison between GT answers and the generated report (PA) findings for some examples, along with the heatmap visualizations using grad-cam for an intuitive understanding of the approach. The CVLL module 200 shows strong alignment with ground-truth in generating normal report findings, whereas part of the findings sometimes get omitted and/or added in describing the abnormalities, especially for rare cases.

FIG. 11 includes a table illustrating results of an ablation study on VQA-Rad dataset to quantify the effect of pretraining, pre-processing, and contrastive learning. As shown in FIG. 11, classification accuracy increases the most with pre-training, while pre-processing and contrastive learning stage further improve the performance.

The present embodiments provide a combined vision and language learning (CVLL) module that adapts pre-trained vision and language models for interpreting and describing a small set of domain-specific medical images. The CVLL module employs a unified approach to VQA and image captioning in predicting class categories or generating descriptive answers for writing automated medical reports. In some embodiments, the CVLL module is specifically tailored for self-supervised contrastive alignment of images and answers in the encoding phase, and conditioning on visual and prior context of retrieved reports in the decoding phase. This has enabled the CVLL module to provide results on challenging tasks of VQA and medical report generation on radiology images. The CVLL module provided herein may be applied to various electronic templates for uses across a wide array of medical domains and may be further extended to generating medical reports from videos.

A number of variations are possible on the examples and embodiments described above. Accordingly, the logical operations making up the embodiments of the technology described herein are referred to variously as operations, steps, objects, elements, components, layers, modules, or otherwise. Furthermore, it should be understood that these may occur in any order, unless explicitly claimed otherwise or a specific order is inherently necessitated by the claim language.

Generally, any creation, storage, processing, and/or exchange of user data associated with the method, apparatus, and/or system disclosed herein is configured to comply with a variety of privacy settings and security protocols and prevailing data regulations, consistent with treating confidentiality and integrity of user data as an important matter. For example, the apparatus and/or the system may include a module that implements information security controls to comply with a number of standards and/or other agreements. In some embodiments, the module receives a privacy setting selection from the user and implements controls to comply with the selected privacy setting. In some embodiments, the module identifies data that is considered sensitive, encrypts data according to any appropriate and well-known method in the art, replaces sensitive data with codes to pseudonymize the data, and otherwise ensures compliance with selected privacy settings and data security requirements and regulations.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

In some embodiments, a method of training a combined vision and language learning model is described, comprising:
receiving a set of training medical images, a set of natural language medical questions designed to inquire features of each image, and a set of descriptive natural language training answers each corresponding to one of the questions;
extracting a set of image features from each image;
extracting a set of first text features and a set of second text features from the set of questions and the set of answers, respectively;
fusing each image feature with each first text feature to form a set of combined features;
encoding, by an encoder, each combined feature and its associated second text feature to form a transformed combined feature contrastively aligned with a transformed second text feature;
computing a bidirectional encoder loss based on the contrastively aligned transformed combined features and the transformed second text features;
for each of the transformed combined features, computing a set of prior context features based on a similarity between the transformed combined feature and the corresponding transformed second text features;
predicting, by a decoder, a set of descriptive natural language answers conditioned on the set of combined features and the set of prior context features;
computing a decoder loss based on the predicted set of answers and the set of training answers; and
updating the encoder and the decoder based at least in part on the bidirectional encoder loss, the decoder loss, or both.

In some embodiments, computing the bidirectional encoder loss includes:
computing a first loss and a second loss based on the contrastive alignment between the transformed combined feature and the transformed second text feature, wherein the first loss and the second loss are computed in opposite directions, and wherein the first loss and the second loss are asymmetric; and
computing the bidirectional encoder loss based on the first loss and the second loss.

In some embodiments, computing the first loss is based on a maximized first directional similarity obtained by comparing each combined feature with its associated second text feature, and wherein computing the second loss is based on a maximized second directional similarity obtained by comparing each second text feature with its associated combined feature.

In some embodiments, the method further includes:
projecting, by the decoder, the set of transformed combined features to a hidden space; and mapping the projected features to a set of classification categories corresponding to a subset of the questions.

In some embodiments of the method, the extracting a set of first text features and a set of second text features is based on a pre-trained natural language model configured to predict masked words locally based on a context provided by other non-masked words in each natural language medical question and descriptive natural language answer.

In some embodiments of the method, the encoder includes a first encoding projection matrix used to generate the transformed combined feature and a second encoding projection matrix used to generate the transformed second text feature, and wherein updating the encoder includes updating the first encoding projection matrix and the second encoding projection matrix.

In some embodiments of the method, computing the set of prior context features includes:
storing the set of transformed second text features in a database; and maximizing a cosine similarity between the set of combined features and the set of transformed second text features in the database using a top-k nearest context neighbor search.

In some embodiments of the method, encoding the set of questions and the set of answers includes:
augmenting text data of each question and answer using a transformation function;
filtering punctuations from the augmented text data;
tokenizing each word in the augmented text data; and
extracting the set of first text features and the set of second text features from the tokenized text data.

In some embodiments of the method, encoding the set of questions and the set of answers is implemented at least in part by a pre-trained encoder that includes a plurality of transformer-based encoder blocks, and wherein each encoder block includes at least a bidirectional self-attention layer and a feed-forward layer.

In some embodiments of the method, the bidirectional self-attention layer is configured to connect a text feature in each question and each answer with all other text features of the respective question and answer to form context-dependent text features.

In some embodiments of the method, fusing the image feature with the first text feature is implemented at least in part by a bilinear attention network model.

In some embodiments of the method, wherein predicting the set of natural language answers is implemented at least in part by a pre-trained decoder that includes a plurality of transformer-based decoder blocks, and wherein each decoder block includes at least a unidirectional self-attention layer and a feed-forward layer.

In some embodiments, the method further includes:
receiving, via the input interface, a target medical image different from each of the set of training medical images; and
using the updated encoder and the updated decoder to generate a medical report describing the target medical image, the medical report including a set of descriptive natural language answers, a set of categorical natural language answers, or both.

In some embodiments, a system of training a combined vision and language learning model is described, including:
an input interface configured to receive a training set of medical images, a set of questions designed to inquire features of each image, and a set of descriptive natural language training answers each corresponding to one of the questions;
a memory configured to store a plurality of processor-executable instructions, the memory including:
an encoder module having an image encoder, a text encoder, a bilinear attention network, and an encoder built upon a contrastive learning model; and
a decoder module; and
a processor configured to execute the plurality of processor-executable instructions to perform operations including:
encoding, by the image encoder, each image to form a set of image features;

encoding, by the text encoder, the questions and the answers to form a set of first text features and a set of second text features, respectively;

fusing, by the bilinear attention network, each image feature with each first text feature to form a set of combined features;

encoding, by the encoder built on the contrastive learning model, each combined feature and its associated second text feature to form a transformed combined feature contrastively aligned with a transformed second text feature;

computing a bidirectional encoder loss based on the contrastively aligned transformed combined features and the transformed second text features;

for each of the transformed combined features, computing a set of prior context features based on a similarity between the transformed combined feature and the corresponding transformed second text features;

predicting, by the decoder module, a set of descriptive natural language answers conditioned on the set of combined features and the set of prior context features;

computing a decoder loss based on the predicted set of answers and the set of training answers; and updating the encoder module and the decoder module based at least in part on the bidirectional encoder loss, the decoder loss, or both.

In some embodiments of the system, computing the bidirectional encoder loss includes:

computing a first loss and a second loss based on the contrastive alignment between the transformed combined feature and the transformed second text feature, wherein the first loss and the second loss are computed in opposite directions, and wherein the first loss and the second loss are asymmetric; and computing the bidirectional encoder loss based on the first loss and the second loss.

In some embodiments of the system, computing the first loss is based on a maximized first directional similarity obtained by comparing each combined feature with its associated second text feature, and wherein computing the second loss is based on a maximized second directional similarity obtained by comparing each second text feature with its associated combined feature.

In some embodiments of the system, the encoder built on the contrastive learning model includes a first encoding projection matrix used to generate the transformed combined feature and a second encoding projection matrix used to generate the transformed second text feature, and wherein updating the encoder includes updating the first encoding projection matrix and the second encoding projection matrix.

In some embodiments, a non-transitory processor-readable storage medium storing a plurality of processor-executable instructions for training a combined vision and language learning model is described, the instructions being executed by a processor to perform operations comprising:

receiving a set of training medical images, a set of natural language medical questions designed to inquire features of each image, and a set of descriptive natural language training answers each corresponding to one of the questions;

extracting a set of image features from the images;

extracting a set of first text features and a set of second text features from the set of questions and the set of answers, respectively;

fusing each image feature with each first text feature to form a set of combined features;

encoding, by an encoder, each combined feature and its associated second text feature to form a transformed combined feature contrastively aligned with a transformed second text feature;

computing a bidirectional encoder loss based on the contrastively aligned transformed combined features and the transformed second text features;

for each of the transformed combined features, computing a set of prior context features based on a similarity between the transformed combined feature and the corresponding transformed second text features;

predicting, by a decoder, a set of descriptive natural language answers conditioned on the set of combined features and the set of prior context features;

computing a decoder loss based on the predicted set of answers and the set of training answers; and updating the encoder and the decoder based at least in part on the bidirectional encoder loss, the decoder loss, or both.

In some embodiments of the storage medium, computing the set of prior context features includes:

storing the set of transformed second text features in a database; and maximizing a cosine similarity between the set of combined features and the set of transformed second text features in the database using a top-k nearest context neighbor search.

Some embodiments of the storage medium further include:

projecting, by the decoder, the set of transformed combined features to a hidden space; and mapping the projected features to a set of classification categories corresponding to a subset of the questions.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above. Connection references, such as "attached," "coupled," "connected," and "joined" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

Additionally, the phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims.

What is claimed is:

1. A method of generating a medical report, the method comprising:
   receiving a medical image and at least one natural language medical question;
   extracting at least one image feature from the medical image;
   extracting at least one text feature from the natural language medical question;
   fusing the at least one image feature with the at least one text feature to form a combined feature;
   encoding, by an encoder, the combined feature to form a transformed combined feature;
   computing a set of prior context features based on a similarity between the transformed combined feature and each of a set of transformed text features derived from a set of training natural language answers; and
   generating, by a decoder, a first natural language answer conditioned on the transformed combined feature and the set of prior context features.

2. The method of claim 1, wherein the extracting the at least one text feature is based on a pre-trained natural language model configured to predict masked words locally based on a context provided by other non-masked words in stored natural language medical questions and corresponding natural language answers.

3. The method of claim 1, wherein the encoder includes a first encoding projection matrix used to generate the transformed combined feature.

4. The method of claim 1, wherein computing the set of prior context features includes:
   receiving a set of training natural language answers, each corresponding to one of a set of training medical images and one of a set of training natural language questions;
   extracting a set of text features from the set of training natural language answers;
   applying a second encoding projection matrix to the set of text features to generate the set of transformed text features;
   storing the set of transformed text features in a database; and
   maximizing a cosine similarity between the transformed combined feature and the set of transformed text features in the database using a top-k nearest context neighbor search.

5. The method of claim 1, wherein encoding the combined feature includes:
   augmenting text data of the natural language medical question using a transformation function;
   filtering punctuations from the augmented text data;
   tokenizing each word in the augmented text data to generate tokenized text data; and
   extracting the at least one text feature from the tokenized text data.

6. The method of claim 1, wherein encoding the combined feature is implemented at least in part by a pre-trained encoder that includes a plurality of transformer-based encoder blocks, and wherein each encoder block includes at least a bidirectional self-attention layer and a feed-forward layer.

7. The method of claim 1, wherein fusing the at least one image feature with the at least one text feature is implemented at least in part by a bilinear attention network model.

8. The method of claim 1, wherein predicting the set of natural language answers is implemented at least in part by a pre-trained decoder that includes a plurality of transformer-based decoder blocks, and wherein each decoder block includes at least a unidirectional self-attention layer and a feed-forward layer.

9. The method of claim 1, wherein the encoder has been trained using a set of training medical images, a set of natural language medical questions, and the set of training natural language answers each corresponding to one of the set of questions.

10. A system for generating a medical report comprising:
    an input interface configured to receive a medical image and at least one natural language medical question;
    a memory configured to store a plurality of processor-executable instructions, the memory including:
      an encoder module having an image encoder, a text encoder, a bilinear attention network, and an encoder built upon a contrastive learning model; and
      a decoder module; and
    a processor configured to execute the plurality of processor-executable instructions to perform operations including:
      encoding, by the image encoder, the medical image to form a set of image features;
      encoding, by the text encoder, the natural language medical question to form a set of first text features;
      fusing, by the bilinear attention network, each image feature in the set of image features with each first text feature in the set of first text features to form a set of combined features;
      encoding, by the encoder built on the contrastive learning model, each combined feature in the set of combined features to form a corresponding transformed combined feature;
      computing a set of prior context features based on a similarity between the transformed combined feature and each of a set of transformed text features derived from a set of training natural language answers; and
      predicting, by the decoder module, a first natural language answer conditioned on the transformed combined feature and the set of prior context features.

11. The system of claim 10, wherein computing the set of prior context features comprises:
    receiving a set of training natural language answers, each corresponding to one of a set of training medical images and one of a set of training natural language questions;
    extracting a set of text features from the set of training natural language answers;
    applying an encoding projection matrix to the set of text features to generate the set of transformed text features;
    storing the set of transformed text features in a database; and
    maximizing a cosine similarity between the transformed combined feature and the set of transformed text features in the database using a top-k nearest context neighbor search.

12. The system of claim 10, wherein encoding each combined feature includes:
    augmenting text data of the natural language medical question using a transformation function;
    filtering punctuations from the augmented text data;
    tokenizing each word in the augmented text data to generate tokenized text data; and
    extracting the set of first text features from the tokenized text data.

13. The system of claim 10, wherein encoding each combined feature in the set of combined features is implemented at least in part by a pre-trained encoder that includes a plurality of transformer-based encoder blocks, and wherein each encoder block includes at least a bidirectional self-attention layer and a feed-forward layer.

14. The system of claim 13, wherein the bidirectional self-attention layer is configured to connect a text feature in the natural language medical question with all other text features of the natural language medical question to form context-dependent text features.

15. The system of claim 10, wherein the encoder has been trained using a set of training medical images, a set of natural language medical questions, and the set of training natural language answers each corresponding to one of the set of questions.

16. A non-transitory processor-readable storage medium storing a plurality of processor-executable instructions for responding to questions about medical images, the plurality of processor-executable instructions being executed by a processor to perform operations comprising:
receiving a medical image and at least one natural language medical question;
extracting a set of image features from the medical image;
extracting at least one text feature from the at least one natural language medical question;
fusing the image features and the at least one text feature to form a set of combined features;
encoding, by an encoder, the set of combined features to form a set of transformed combined features;
computing a set of prior context features based on a similarity between the set of transformed combined features and a set of transformed text features derived from a set of training natural language answers; and
predicting, by a decoder, a set of descriptive natural language answers conditioned on the set of transformed combined features and the set of prior context features.

17. The storage medium of claim 16, wherein computing the set of prior context features includes:
storing the set of transformed text features in a database; and
maximizing a cosine similarity between the set of transformed combined features and the set of transformed text features in the database using a top-k nearest context neighbor search.

18. The storage medium of claim 16, further comprising:
projecting, by the decoder, the set of transformed combined features to a hidden space; and
mapping the projected set of transformed combined features to a set of classification categories corresponding to a subset of the questions.

19. The storage medium of claim 16, further comprising:
receiving the set of training natural language answers;
extracting a second set of text features from the set of training natural language answers; and
encoding, by the encoder, the second set of text features to generate the set of transformed text features.

20. The storage medium of claim 16, wherein the encoder includes a first encoding projection matrix used to generate the set of transformed combined features.

* * * * *